UNITED STATES PATENT OFFICE.

WILLEM JACOBUS DE BAS, OF THE HAGUE, NETHERLANDS.

PROCESS FOR THE PRODUCTION OF ARTIFICIAL STONE.

1,187,717.　　　　Specification of Letters Patent.　　Patented June 20, 1916.

No Drawing.　　Application filed December 27, 1912.　Serial No. 738,798.

*To all whom it may concern:*

Be it known that I, WILLEM JACOBUS DE BAS, director, a subject of the Queen of the Netherlands, residing at The Hague, in the Kingdom of the Netherlands, have invented new and useful Improvements in Processes for the Production of Artificial Stone, of which the following is a specification.

This invention relates to a process of making artificial stone suitable for flooring, etc., and has for an object the production of stone that is homogeneous, dense, and hard throughout.

Further objects of my invention are to provide means to insure a uniform distribution of water throughout the mixture of cement in the mold, thereby preventing unequal hardening and warping of the artificial stone during setting; and also to provide means to readily remove the finished cement block from the mold.

In this process, the cement composition for the stone is placed in a suitable polished mold capable of withstanding very high pressures, and in order to prevent the cement blocks from sticking to the sides of the mold, especially with large sizes, the polished walls are first moistened and then lined with sheets of mica, aluminum, or other suitable material and their surfaces moistened before the addition of the cement mixture. Upon removal of the compressed cement block, the sheets of mica, aluminum, etc., tend to cling to it, but are readily removed therefrom, leaving a smooth hard surface upon the block.

In carrying out the process, different cement compositions are used for the upper and lower layers of the cement block, these compositions, however, are so chosen that the hardening and binding of the upper and lower layers take place as uniformly as possible, and are subjected to uniform pressure throughout.

When desired, blocks of stone resembling variegated colored marble may be made by mixing suitable cement compositions to a paste with water and distributing the colors in the mold previously lined with sheets of mica, aluminum, etc., to produce the design desired. The surfaces against which the cement is applied are first moistened to prevent loss of moisture from the mass. By shaking the mold, the colored pastes are agitated, and thereby distributed in irregular lines, producing effects pleasing to the eye, and more nearly resembling natural stone. The layer of colored compositions should be sufficiently deep to produce a colored effect to a considerable distance in the body of the finished stone, so as not to be worn off too quickly. During the mixing of the colored masses, a non-coloring adhesive, such as isinglass, is coated upon or added thereto to serve as a preliminary binding agent until the mass hardens. Upon the moist layer of colored cement composition, a thin layer of dry cement, which has been mixed with a small quantity of, for example, river sand, is applied until the excess of water from the colored mass no longer passes through the cement layer. Upon this layer of cement and sand, a further quantity of a suitably moistened mixture of cement and sand, in proportion of about one part of cement to two parts sand, also containing the adhesive, is added, to completely fill the mold. The entire mass of cement is now subjected for a short time to a pressure of from 250 to 400 or more kilograms per square centimeter of surface depending upon the thickness of and size of the artificial stones to be produced. The compressed mass is then somewhat loosened from the supporting plate, and removed or displaced thereon for the purpose of forming a free space between the surface of the supporting plate and the surface of the artificial stone. The mass of cement is then moistened from the top and again subjected to the same pressure. The reason for the second moistening is as follows:—During the first pressure, moisture collects in the lower layer of the compressed product, the upper layers in consequence becoming dry. This would result in a non-uniform solidification of the entire mass, and it is to prevent this that additional moisture is applied to the upper layers, and pressure again applied. Upon the withdrawal of the first application of pressure, the moisture which collected in the lower layers of the compressed product tends to distribute itself upward, while the additional water applied to the upper surface of the mass distributes itself downward, producing a uniform distribution of moisture throughout the entire mass. Following the addition of water, the block is again subjected to pressure as above referred to, the final pressing operation effecting an exceedingly close contact of all the component parts, resulting in a complete and uniform binding and solidification of the entire mass. After the second application of pressure the block is removed from the mold, the adhesive added to the cement serving as a binder until the mass has hardened. The block is now placed upon a smooth flat surface, for example, a glass plate, where it remains for about twenty-four hours, to allow it to dry thoroughly. It is then placed in water for a short time, and then allowed to harden for three or four weeks. At the end of this time, the stone may be polished with tin ashes and soft metal such as solder.

Cement blocks of varying sizes may be made by this process, for example, as large as 60x60 centimeters, or even 90x90 centimeters in area, and are found to be in every respect suitable for flooring, wall covering, and for other uses. They possess great hardness, and do not warp in the hardening process, nor in use.

I claim:—

1. The process of making artificial stone blocks, which comprises placing in a mold a plurality of layers of cement composition, some of which contain moisture and an adhesive, applying high pressure to the mass of cement composition, releasing the pressure and supplying water to the upper portion of said mass, and reapplying high pressure to said mass.

2. The process of making artificial stone blocks, which comprises placing in a mold a plurality of layers of cement composition some of which contain moisture and an adhesive, subjecting the mass to a pressure of about 250 kilograms or higher per square centimeter, releasing the pressure and supplying water to the upper portion of the mass, and resubjecting the mass to a pressure of about 250 kilograms or higher per square centimeter.

3. The process of making artificial stone blocks, which consists in wetting the surfaces of a mold, adding a layer of moistened cement composition to said mold, adding thereupon a thin layer of a dry cement mixture, then adding a layer of wet cement composition, subjecting said mass to high pressure, releasing said pressure, supplying water to said mass, again subjecting said mass to high pressure, and then drying and hardening said compressed block.

4. The process of making artificial stone blocks which consists in applying removable surfaces to the walls of a mold, wetting said surfaces, adding a layer of moistened cement composition, next adding a thin layer of a dry cement mixture, then adding a quantity of wet cement composition, subjecting said mass to high pressure, releasing said pressure, loosening said mass from the bottom of the mold, moistening the upper part of said cement composition, again applying high pressure to said mass of cement, releasing said pressure, removing the finished block from the mold, drying said block, moistening said block, and allowing said block to harden.

5. The process of making artificial stone blocks which consists in applying removable surfaces to the walls of a mold, wetting said surfaces, adding a layer of moistened cement composition, next adding a thin layer of a dry cement mixture, then adding a quantity of wet cement composition, subjecting the mass to a pressure of about 250 kilograms or higher per square centimeter, releasing said pressure, loosening said mass from the bottom of the mold, moistening the upper part of said cement composition, again subjecting the mass to a pressure of about 250 kilograms per square centimeter, releasing said pressure, removing the finished block from the mold, drying said block, moistening said block, and allowing said block to harden.

In testimony whereof I have signed my name to this specification in the presence of two subscribing witnesses.

WILLEM JACOBUS DE BAS.

Witnesses:
J. G. BAILEY,
I. I. HELSDON RIX.